United States Patent [19]

Daute et al.

[11] Patent Number: 5,795,949
[45] Date of Patent: Aug. 18, 1998

[54] USE OF DIMERDIOL IN POLYURETHANE MOLDINGS

[75] Inventors: Peter Daute, Essen; Roland Gruetzmacher, Wuelfrath; Alfred Westfechtel; Nicole Mertscheit, both of Hilden, all of Germany

[73] Assignee: Henkel Kommanditgesellschaft auf Aktien, Duesseldorf, Germany

[21] Appl. No.: 750,609

[22] PCT Filed: Jun. 1, 1995

[86] PCT No.: PCT/EP95/02094

§ 371 Date: Dec. 10, 1996

§ 102(e) Date: Dec. 10, 1996

[87] PCT Pub. No.: WO95/34592

PCT Pub. Date: Dec. 21, 1995

[30] Foreign Application Priority Data

Jun. 10, 1994 [DE] Germany .................. 44 20 310.1

[51] Int. Cl.⁶ .................................................. C08G 18/32
[52] U.S. Cl. ................... 528/65; 528/66; 528/74.5; 528/75; 528/76; 528/77; 528/80; 528/81; 528/83; 528/84; 528/85
[58] Field of Search .................. 528/66, 65, 74.5, 528/75, 76, 77, 80, 81, 83, 84, 85

[56] References Cited

U.S. PATENT DOCUMENTS 4,705,721  11/1987  Frisch et al. .......................... 528/75

FOREIGN PATENT DOCUMENTS

| 2577934 | 8/1986 | France . |
|---|---|---|
| 1198348 | 3/1966 | Germany . |
| 1768313 | 4/1971 | Germany . |
| 1225795 | 6/1971 | Germany . |
| 4128649A1 | 3/1993 | Germany . |
| 4237965.2 | 5/1994 | Germany . |
| 4308100A1 | 9/1994 | Germany . |
| 9113918 | 9/1991 | WIPO . |

OTHER PUBLICATIONS

DIN 55958: "Harze: Begriffe" (Resins: terms and definitions), Dec. 1988.

DIN 53240: "Bestimmung der Hydroxylzahl" (Determination of hydroxyl value), Dec. 1971.

Saunders & Frisch, Polyurethanes: Chemistry and Technology, vol. XVI of the "High Polymers" Series, Interscience Publishers, New York/London, Part II 1964, pp. 490–524.

Primary Examiner—John M. Cooney, Jr.
Attorney, Agent, or Firm—Ernest G. Szoke; Wayne C. Jaeschke; Martin G. Meder

[57] ABSTRACT

The present invention relates to the use of dimerdiols and/or trimertriols along with other polyols in the making of polyurethane moldings.

35 Claims, No Drawings

5,795,949

1

USE OF DIMERDIOL IN POLYURETHANE MOLDINGS

FIELD OF THE INVENTION

This invention relates to the use of dimerdiol as polyol component in polyurethane moldings.

DISCUSSION OF RELATED ART

Dimeric fatty alcohols (dimerdiols) have been known for some time.

Thus, their production by dimerization of unsaturated fatty alcohols with basic alkaline earth metal compounds at more than 280° C. is described, for example, in DE 11 98 348.

They may also be produced by hydrogenation of dimeric fatty acids and/or esters thereof in accordance with DE-B-17 68 313. Under the conditions described in that document, not only are the carboxyl groups of the fatty acids hydrogenated to hydroxyl groups, any double bonds still present in the dimerized fatty acids or their esters are also completely or partly hydrogenated. However, the hydrogenation may also be carried out in such a way that the double bonds remain completely intact during the hydrogenation reaction. In this case, unsaturated dimerdiols are obtained. The hydrogenation is preferably carried out in such a way that the double bonds are completely hydrogenated.

Another method of producing dimerdiols comprises dimerizing unsaturated alcohols in the presence of silica/alumina catalysts and basic alkali metal compounds (cf. International patent application WO 91/13918).

Irrespective of the described processes for producing the dimerdiols, dimerdiols which have been produced from fatty acids or their esters or fatty alcohols containing 18 carbon atoms are preferred. Dimerdiols containing 36 carbon atoms are obtained in this way. Dimerdiols which have been produced by the industrial processes mentioned above always contain varying amounts of trimertriols and monohydric alcohols. In general, the percentage content of dimerdiols is in excess of 70% by weight, the rest being trimertriols and monomer alcohols. These dimerdiols and also purer dimerdiols containing more than 90% by weight of dimerdiol may be used for the purposes of the present invention. Particular preference is attributed to dimerdiols containing more than 90 to 99% by weight of dimerdiol, of which those dimerdiols where the double bonds are at least partly or completely hydrogenated are preferred.

Trimerized fatty acid is always formed in the production of dimer fatty acid. This trimer fatty acid may be concentrated by distilling off the dimer fatty acid. After esterification with methanol for example, the esters of the trimer fatty acid can be hydrogenated to trimertriol similarly to the esters of dimer fatty acid. This trimertriol, a trihydric alcohol containing 54 carbon atoms, may also be used for the purposes of the invention.

It is also known that dimerdiol can be used as polyol for the production of polyurethane coatings by reaction with diisocyanates. Thus, polyurethane lacquers of dimeric and/or trimeric fatty alcohols containing on average 36 or 54 carbon atoms are described in DE 12 25 795.

It is known that "casting resins" are liquid synthetic resins or synthetic resins which can be liquefied by moderate heating and which are cast into open molds and cure therein. Casting resins also include isocyanate casting resins which, according to DIN 55958, are understood to be synthetic resins which are based on aliphatic, cycloaliphatic or aromatic isocyanates and which still contain free terminal isocyanate groups. They may be cured under various conditions. Thus, a one-component casting resin, for example, consists of a polyurethane prepolymer containing free or blocked terminal isocyanate groups which cure on exposure to moisture, optionally accompanied by heating in order, for example, to accelerate the reaction or to increase strength. A two-component casting resin is based, for example, on polyhydroxy compounds based on branched polyesters as the first component and on polyisocyanate as the second component. After the two components have been mixed, they cure at room temperature or at slightly elevated temperature. Two-component casting resins of the type in question are used, for example, for the encapsulation of cable fittings.

Casting resins of primarily difunctional compounds can be thermoformed or melted and show thermoplastic behavior.

Corresponding coatings or polyurethane moldings, for example in the form of coating compositions or casting resins, are often used in a chemically aggressive environment. Even under these conditions, the polyurethanes should not undergo hydrolysis because otherwise their mechanical properties or their protective function would be affected.

Accordingly, the problem addressed by the present invention was to improve the resistance of polyurethane moldings to hydrolysis and chemicals and in aggressive media, more particularly to hydrolytic degradation in boiling water or acids or alkalis at elevated temperatures.

It has now surprisingly been found that polyurethane moldings with dramatically improved resistance to alkaline and acidic aqueous media are obtained with dimerdiol contents of only 5% by weight or more, based on the polyol component as a whole.

DETAILED DESCRIPTION OF THE INVENTION

The present invention relates to the use of dimerdiol and/or trimertriol as polyol component in polyurethane moldings, 5 to 70% by weight and preferably 10 to 40% by weight of the polyol component on which the corresponding polyurethanes are based consisting of dimerdiol and/or trimertriol and 30 to 95% by weight and preferably 60 to 90% by weight of other polyols.

Polyurethane moldings in the context of the invention are coating compositions, elastomers or casting resins, preferably two-component casting resins.

Coating compositions, preferably two-component coating compositions, are used for surface protection, for example as paints or as undersealing compounds.

Elastomers are polymers with rubber-elastic behavior which may be used for example as a sealing material.

Polyurethane casting resins are defined in DIN 55958.

The dimerdiol or the trimerdiol has hydroxyl values of 180 to 215 and preferably 200 to 210.

5 to 70% by weight and preferably 10 to 40% by weight of the polyol component of the polyurethane moldings according to the invention consists of dimerdiol and/or trimerdiol, the rest consisting of another polyol typically encountered in polyurethane chemistry.

These polyols may be polyether, polyester or oleochemical polyols or mixtures of these compounds.

A review of polyethers typically encountered in polyurethane chemistry can be found, for example, in Ullmanns Enzyklopädie der technischen Chemie, 4th Edition, Vol. 19, Verlag Chemie, Weinheim, page 304. Polytetrahydrofuran is preferably used as the polyether polyol.

Polyesters are preferably used as polyols in the polyurethane moldings. An overview of polyesters typically encountered in polyurethane chemistry can be found, for example, in Ullmanns Enzyklopädie der technischen Chemie, 4th Edition, Vol. 19, Verlag Chemie, Weinheim, page 305.

Of these polyesters, the polycarbonates are particularly preferred for the purposes of the invention.

Examples of suitable hydroxyl-terminated polyesters are polyesters based on the dicarboxylic acids adipic, phthalic, maleic and azelaic acid and dimer fatty acids and diols, such as ethylene glycol, propylene glycol, neopentyl glycol, hexane-1,6-diol and butane-1,4-diol.

Another group of preferred polyols are the oleochemical polyols.

Oleochemical polyols are understood to be polyols based on natural oils and fats, for example the reaction products of epoxidized fatty compounds with monohydric, dihydric or polyhydric alcohols or glycerol esters of long-chain fatty acids which are at least partly substituted by hydroxyl groups.

A sub-group of these compounds are the ring opening products of epoxidized triglycerides, i.e. epoxidized fatty acid glycerol esters where ring opening has been carried out with the ester bonds intact. The ring opening products may be produced from a variety of epoxidized triglycerides of vegetable or animal origin. For example, epoxidized triglycerides containing 2 to 10% by weight of epoxide oxygen are suitable. Products such as these can be produced from a number of fats and oils, for example beef tallow, palm oil, peanut oil, rapeseed oil, cottonseed oil, soybean oil, sunflower oil and linseed oil, by epoxidation of the double bonds. Particularly preferred epoxidized triglycerides are epoxidized soybean oil and epoxidized linseed oil.

Suitable alcohols for the ring opening of the epoxidized triglycerides are methanol, ethanol, propanol, isopropanol, butanol, hexanol, 2-ethyl hexanol, fatty alcohols containing 6 to 22 carbon atoms, cyclohexanol, benzyl alcohol, ethane-1,2-diol, propane-1,2-diol, propane-1,3-diol, butane-1,4-diol, hexane-1,6-diol, neopentyl glycol, trimethylol propane, glycerol, trimethylol ethane, pentaerythritol, sorbitol and hydroxy compounds containing ether groups, such as alkyl glycols or oligomeric glycols and oligomeric glycerols.

The ring opening reaction of epoxidized fatty acid esters or triglycerides with an alcohol may optionally be followed by transesterification with the same or with other subsequently added triglycerides, for example palm oil, peanut oil, rapeseed oil, cottonseed oil, soybean oil, sunflower oil and linseed oil. Corresponding oleochemical polyols are described, for example, in German patent application DE-A1 41 28 649.

Another group of oleochemical polyols are ring opening and transesterification products of epoxidized fatty acid esters of lower alcohols, i.e. epoxidized fatty acid methyl, ethyl, propyl or butyl esters. The ring opening or transesterification products with trihydric to tetrahydric alcohols, are preferred, reaction products with ethylene glycol, propylene glycol, oligomeric ethylene glycols, oligomeric propylene glycols, glycerol, trimethylol propane or pentaerythritol being particularly preferred. The products in question may be produced by known epoxidation or ring opening processes. The transesterification may be carried out during or after the ring opening step by removal of the lower alcohol from the reaction equilibrium. Ring opening and transesterification products where a molar ratio of epoxidized fatty acid ester to the alcohol used for the reaction of 1:1 to 1:10 has been applied are preferred.

The oleochemical polyols also include the reaction products of epoxidized fatty alcohols with $C_{2-8}$ alcohols having a functionality of 1 to 10 and, more particularly, 2 to 4 in a molar ratio of the epoxide groups to the hydroxyl groups of 1:1 to 1:10.

According to the invention, it is also possible to use oleochemical polyols obtainable by the transesterification of dihydric or polyhydric alcohols, for example the adduct of ethylene oxide or propylene oxide with glycerol, with triglycerides such as, for example, palm oil, peanut oil, rapeseed oil, cottonseed oil, soybean oil, sunflower oil and linseed oil.

The hydroxyl values according to DIN 53240 of the remaining polyols is in the range from 5 to 600, preferably in the range from 20 to 300 and more preferably in the range from 50 to 200.

The isocyanate component of the casting resins according to the invention is an isocyanate compound with a functionality of 2 to 4. Suitable isocyanate compounds are both aromatic and aliphatic monocyclic and polycyclic, polyfunctional isocyanate compounds. An overview of polyisocyanates typically encountered in polyurethane chemistry can be found, for example, in Ullmanns Enzyklopädie der technischen Chemie, 4th Edition, Vol. 19, Verlag Chemie, Weinheim, page 303.

DESCRIPTION OF THE INVENTION

Thus, in a first embodiment, toluenediisocyanate or diphenyl methane diisocyanate may be used as the aromatic isocyanate compound. Technical diphenyl methane diisocyanate with a content of higher diisocyanates and a functionality of isocyanate groups of greater than 2 is particularly suitable. Another suitable aromatic diisocyanate is xylylene diisocyanate.

In addition, a number of aliphatic isocyanates with a functionality of 2 or more may be used. Examples of such aliphatic isocyanates are isophorone diisocyanate, tris-(6-isocyanatohexyl)-isocyanurate, hexamethylene diisocyanate trimerized via biuret groups and dicyclohexyl methane diisocyanate as cyclic aliphatic diisocyanates. Other examples are aliphatic, straight-chain diisocyanates obtained by phosgenation of diamines, for example tetramethylene diisocyanate or hexamethylene diisocyanate.

Besides the polyfunctional isocyanate compounds, prepolymers may also be used in principle as isocyanate component in the polyurethane moldings according to the invention, more particularly two-component casting resins. Prepolymers in the present context are understood to be the adducts of polyfunctional isocyanates with polyhydric alcohols, for example the reaction products of one of the above-mentioned aromatic or aliphatic diisocyanates with ethylene glycol, propylene glycol, glycerol, trimethylol propane or pentaerythritol. Reaction products of diisocyanates with polyether polyols, for example polyether polyols based on polyethylene oxide or polypropylene oxide, may also be used as prepolymers.

In the production of the polyurethane moldings, the equivalent ratio of the NCO groups to the OH groups (NCO:OH) is generally in the range from 1.2:1 to 0.8:1 and preferably in the range from 1.05:1 to 0.95:1.

In addition, the polyurethane moldings, more particularly two-component casting resins and coating compositions, may contain various auxiliaries which are preferably incorporated in the polyol. Fillers, for example, may be used. Suitable fillers are inorganic compounds which are not reactive to isocyanates, for example chalk or gypsum, precipitated silicas, zeolites, bentonites, ground minerals and other inorganic fillers known to the expert active in the field. Organic fillers, more particularly chopped fibers and the like, may also be used. Fillers which provide the casting resins with thixotropic properties are preferably used.

The polyurethane moldings according to the invention, more particularly two-component casting resins or coating compositions, may also contain accelerators. Suitable accelerators are, for example, tertiary bases, such as bis-(N,N-dimethylamino)-diethyl ether, dimethyl aminocyclohexane, N,N-dimethyl benzylamine, N-methyl morpholine and the reaction products of dialkyl-(β-hydroxyethyl)-amine with monoisocyanates and esterification products of dialkyl-(β-hydroxyethyl)-amine and dicarboxylic acids. Another important accelerator is 1,4-diaminobicyclo-(2,2,2)-octane. Non-basic substances may also be used as accelerators. Suitable non-basic substances are metal compounds, for example iron pentacarbonyl, iron acetyl acetonate and tin(II) (2-ethylhexoate), dibutyl tin dilaurate or molybdenum glycolate.

In addition to the compounds mentioned, the polyurethane moldings, more particularly casting resins or coating compositions, may contain other auxiliaries, including solvents. Suitable solvents are those which do not react with isocyanate groups, for example halogenated hydrocarbons, esters, ketones, aromatic hydrocarbons and the like. Plasticizers, flameproofing agents, retarders, dyes and antiagers, as used in corresponding casting resins, may also be incorporated.

The isocyanate casting resins or coating compositions are stored in two-component form pending their use, i.e. the polyol and the isocyanate compound are separately stored up to this point. For application, the two compounds are mixed together and the mixture is applied to the substrates to be bonded. The general knowledge of the expert may be applied in regard to the mixing ratio and in regard to measures for influencing pot life. Such knowledge is documented, for example, in the book by Saunders and Frisch entitled "Polyurethanes, Chemistry and Technology", Vol. XVI of the "High Polymers" series, Interscience Publishers, New York/London, Part II (1964), pages 490 to 524. To find the correct mixing ratio, the expert will generally seek equivalence between isocyanate and OH groups. To this end, the OH value of the alcohol mixtures and the isocyanate index of the isocyanate compounds may be determined in preliminary tests and the results used to calculate the number of moles of reactive groups per gram.

In their cured state, the polyurethane moldings produced in accordance with the invention are resistant to boiling softened water or salt-containing water and to aggressive media, such as acids and alkalis. Accordingly, the casting resins and the coating compositions are suitable for use in the chemical industry, in the mineral oil industry and in baths and also in facades. The mixture represents an economical alternative to the resins and compositions of 100% dimerdiol.

The invention is illustrated by the following Examples.

EXAMPLES

All percentages are by weight, unless otherwise indicated.

The tests were carried out on three different polyester polyols, namely:

1. polyol 1, Sovermol-Pol 1080/V, a branched oleochemical polyether/ester polyalcohol with an OH value (OHV) of 170 (manufacturer: Henkel KGaA);

2. polyol 2, an oleochemical polyol from the reaction of epoxidized soybean oil with head-fractionated fatty acid, OHV 96 (manufacturer: Henkel KGaA);

3. polyol 3, an oleochemical polyol from the reaction of epoxidized soybean oil with methanol, OHV 184 (manufacturer: Henkel KGaA).

A dimerdiol (Sovermol Pol 900, Henkel KGaA) with an OHV of 208 was used as additive.

PUR test specimens (diameter 5 cm) were produced from the polyol mixtures and Desmodur VKS (diphenyl methane diisocyanate manufactured by Bayer AG). They were then cured for 24 hours at room temperature (around 23° C.) and for 2 days at 80° C.

Formulation:

20 g polyol mixture

Desmodur VKS (corresponding to the OHV of the polyol mixture)

5% Baylith Paste, based on polyol (a zeolite paste manufactured by Bayer AG)

0.03 g Fomrez UL 24 (a catalyst manufactured by Witko).

To determined hydrolysis stability, the test specimens were stored in 20% potassium hydroxide at 80° C. and their weight and Shore hardness were determined at certain time intervals.

Example 1

Addition of 30% by weight of dimerdiol to polyester polyols 1, 2 and 3. The values of 100% polyols 1, 2 and 3 are shown in brackets for comparison.

| Time | Polyester Polyol | | |
|---|---|---|---|
| (days) | 1 | 2 | 3 |
| 0 | 15 (15) | 15 (15) | 15.1 (15.2) |
| 1 | 15 (15) | 15 (15) | 15.3 (15.5) |
| 4 | 15 (14.4) | 15 (15) | 15.2 (14.5) |
| 7 | 14.8 (13.2) | 15 (14.8) | 14.9 (12.2) |
| 14 | 14.5 (Dissolved) | 14.8 (14.0) | — |

Example 2

Addition of dimerdiol to polyester polyol 1.

a) Weight (g) of test specimens as a function of the dimerdiol content in % by weight and the time in days

| Time | % Dimerdiol | | | |
|---|---|---|---|---|
| (Days) | 0 | 10 | 20 | 40 |
| 0 | 20 | 20 | 20 | 20 |
| 10 | 19.6 | 18.0 | 18.6 | 19.0 |
| 28 | 10.7 | 17.2 | 18.3 | 18.8 | b) Shore hardness D as a function of the dimerdiol content in % by weight and the time in days

| Time | % Dimerdiol | | | |
|---|---|---|---|---|
| (Days) | 0 | 10 | 20 | 30 |
| 0 | 66 | 69 | 67 | 63 |
| 10 | 68 | 60 | 56 | 46 |
| 28 | — | 61 | 62 | 50 |

Example 3
Addition of dimerdiol to polyester polyol 2.
a) Weight (g) of test specimens as a function of the dimerdiol content in % by weight and the time in days

| Time | % Dimerdiol | | | |
|---|---|---|---|---|
| (Days) | 0 | 10 | 20 | 40 |
| 0 | 15.8 | 16.7 | 15.9 | 15.7 |
| 3 | 15.3 | 16.5 | 15.9 | 15.8 |
| 4 | 15.0 | 16.5 | 15.8 | 15.8 |
| 6 | 14.2 | 15.8 | 15.4 | 15.4 |
| 21 | — | — | 14.0 | 14.4 | b) Shore hardness A as a function of the dimerdiol content in % by weight and the time in days

| Time | % Dimerdiol | | | |
|---|---|---|---|---|
| (Days) | 0 | 10 | 20 | 30 |
| 0 | 38 | 38 | 38 | 49 |
| 3 | 45 | 40 | 36 | 46 |
| 4 | 46 | 44 | 36 | 49 |
| 6 | 51 | 44 | 39 | 46 |
| 21 | — | — | 48 | 58 |

Example 4
Addition of dimerdiol to polyester polyol 3.
a) Weight of test specimens (g) as a function of the dimerdiol content in % by weight and the time in days

| Time | % Dimerdiol | | |
|---|---|---|---|
| (Days) | 0 | 10 | 20 |
| 0 | 20 | 20 | 20 |
| 7 | 17.3 | 18.1 | 19.8 | b) Shore hardness D as a function of the dimerdiol content in % by weight and the time in days

| Time | % Dimerdiol | | |
|---|---|---|---|
| (Days) | 0 | 10 | 20 |
| 0 | 71 | 63 | 51 |
| 7 | 64 | 60 | 47 |

What is claimed is:

1. In the process for producing polyurethane articles in the form of moldings, castings and coatings from a polyurethane resin comprising at least one isocyanate resin and at least one polyol, wherein the improvement comprises adding as the polyol a polyol mixture consisting of:
   about 10 to about 40% by weight of fatty alcohols selected from the group consisting of dimerdiol, trimer triol and mixtures thereof; and
   about 60 to about 90% by weight of polyol selected from the group consisting of polyester polyols selected from the group consisting of polycarbonates and hydroxyl-terminated polyesters derived from the dicarboxylic acids adipic phthalic maleic and azelaic acid and dimer fatty acids and diols and (b) oleochemical polyols and mixtures thereof.

2. The improved process of claim 1, wherein the polyurethane resin is a two-component resin.

3. The improved process of claim 1, wherein the polyurethane resin is a single-component resin.

4. The improved process of claim 1, wherein the polyol mixture has a hydroxyl value of about 5 to about 600.

5. The improved process of claim 1, wherein the polyol mixture has a hydroxyl value of about 20 to about 300.

6. The improved process of claim 1, wherein the polyol mixture has a hydroxyl value of about 50 to about 200.

7. The improved process of claim 1, wherein the isocyanate resin is an aromatic diisocyanate.

8. The improved process of claim 7 wherein the aromatic diisocyanate is selected from the group consisting of diphenyl methane diisocyanate, diphenyl methane diisocyanate with a functionality of more than 2, toluene diisocyanate and mixtures thereof.

9. The improved process of claim 1, wherein the isocyanate resin is an aliphatic diisocyanate.

10. The improved process of claim 9, wherein the aliphatic diisocyanate is selected from the group consisting of isophorone diisocyanate, tris-(6-isocyanatohexyl)-isocyanurate, dicyclohexyl methane diisocyanate and mixtures thereof.

11. The improved process of claim 1, wherein the isocyanate resin is a polyurethane prepolymer containing on average two or more isocyanate groups per molecule.

12. The improved process of claim 11, wherein the polyurethane prepolymer is selected from the group consisting of adducts of aliphatic diisocyanates with diols, adducts of aliphatic diisocyanates with triols, adducts of aromatic diisocyanates with diols, adducts of aromatic diisocyanates with triols and mixtures thereof.

13. The improved process of claim 1, wherein the isocyanate resin to polyol mixture has an NCO:OH equivalent ratio of about 1.2:1 to about 0.8:1.

14. The improved process of claim 1, wherein the isocyanate resin to polyol mixture has an NCO:OH equivalent ratio of about 1.05:1 to about 0.95:1.

15. The improved process of claim 1, wherein the polyurethane resin further contains at least one accelerator.

16. The improved process of claim 1, wherein the polyurethane resin further contains at least one stabilizer.

17. The improved process of claim 1, wherein the polyurethane resin further contains at least one solvent non-reactive to isocyanate groups.

18. The improved process of claim 1, wherein the polyurethane resin further contains at least one retarder.

19. The improved process of claim 1, wherein the polyurethane resin contains fillers.

20. The improved process of claim 19, wherein the fillers are selected from chalk, gypsum, silica, organic fibers, inorganic fibers, zeolite powder and mixtures thereof.

21. The articles produced by the improved process of claim 1.

22. In a method of using polyurethane articles for their resistance to aggressive chemical conditions, wherein the improvement comprises using the polyurethane articles produced by the improved process of claim 1.

23. The improved method of claim 22, wherein the aggressive chemical condition comprises boiling water, aqueous acids, aqueous alkalis, organic solvents and mixtures thereof.

24. The improved process of claim 1, wherein the polyurethane resin comprises:
   an NCO:OH equivalent ratio of isocyanate resin to polyol mixture of about 1.2:1 to about 0.8:1; and
   a polyol mixture consisting of about 10 to about 40% by weight of dimer diol having a hydroxyl value of about 5 to about 600 and about 60 to about 90% by weight of polyol selected from the group consisting of branched oleochemical polyether/polyester polyalcohol, the reaction product of epoxidized soybean oil with head-fractionated fatty acid, the reaction product of epoxidized soybean oil with methanol, and mixtures thereof.

25. The improved process of claim 1, wherein the polyurethane resin comprises an NCO:OH equivalent ratio of diphenyl methane diisocyanate resin to polyol mixture of about 1.05:1 to about 0.95:1;

said polyol mixture consisting of about 30% by weight of dimer diol having a hydroxyl value of about 208 and about 70% by weight of polyol selected from the group consisting of branched oleochemical polyether/polyester polyalcohols, the reaction product of epoxidized soybean oil with head-fractionated fatty acid, the reaction product of epoxidized soybean oil with methanol, and mixtures thereof;

a catalyst; and zeolite paste.

26. An article of manufacture in the form of polyurethane resin moldings, polyurethane resin castings and articles coated with polyurethane resins, wherein the polyurethane resin comprises the reaction product of:

at least one isocyanate resin; and a polyol mixture consisting of about 10 to about 40% by weight of fatty alcohols selected from the group consisting of dimerdiol, trimer triol and mixtures thereof and about 60 to about 90% by weight of polyol selected from the group consisting of (a) polyester polyols selected from the group consisting of polycarbonates and hydroxyl-terminated polyesters derived from the dicarboxylic acids adipic, phthalic maleic and azelaic acid and dimer fatty acids and diols, and (b) oleochemical polyols and mixtures thereof.

27. The article of manufacture of claim 26, wherein the polyol mixture has a hydroxyl value of about 5 to about 600.

28. The article of manufacture of claim 26, wherein the polyol mixture has a hydroxyl value of about 20 to about 300.

29. The article of manufacture of claim 26, wherein the polyol mixture has a hydroxyl value of about 50 to about 200.

30. The article of manufacture of claim 26, wherein the isocyanate resin to polyol mixture has an NCO:OH equivalent ratio of about 1.2:1 to about 0.8:1.

31. The article of manufacture claim 26, wherein the isocyanate resin to polyol mixture has an NCO:OH equivalent ratio of about 1.05:1 to about 0.95:1.

32. In a method of using articles of manufacture for their resistance to aggressive chemical conditions, wherein the improvement comprises using the polyurethane articles of claim 26.

33. The improved method of claim 32, wherein the aggressive chemical condition comprises boiling water, aqueous acids, aqueous alkalis, organic solvents and mixtures thereof.

34. The article of manufacture of claim 26, wherein the polyurethane resin comprises:

an NCO:OH equivalent ratio of isocyanate resin to polyol mixture of about 1.2:1 to about 0.8:1; and a polyol mixture consisting of about 10 to about 40% by weight of dimer diol having a hydroxyl value of about 5 to about 600 and about 60 to about 90% by weight of polyol selected from the group consisting of branched oleochemical polyether/polyester polyalcohol, the reaction product of epoxidized soybean oil with head-fractionated fatty acid, the reaction product of epoxidized soybean oil with methanol, and mixtures thereof.

35. The improved process of claim 26, wherein the polyurethane resin comprises:

an NCO:OH equivalent ratio of diphenyl methane diisocyanate resin to polyol mixture of about 1.05:1 to about 0.95:1;

a polyol mixture consisting of about 30% by weight of dimer diol having a hydroxyl value of about 208 and about 70% by weight of polyol selected from the group consisting of branched oleochemical polyether/polyester polyalcohols, the reaction product of epoxidized soybean oil with head-fractionated fatty acid, the reaction product of epoxidized soybean oil with methanol, and mixtures thereof; a catalyst; and zeolite paste.

* * * * *